Patented May 29, 1928.

1,671,228

UNITED STATES PATENT OFFICE.

OSCAR A. CHERRY, OF WAUWATOSA, WISCONSIN, ASSIGNOR TO THE CUTLER-HAMMER MFG. CO., OF MILWAUKEE, WISCONSIN, A CORPORATION OF WISCONSIN.

SOUND RECORD.

No Drawing.   Application filed September 13, 1923.   Serial No. 662,561.

This invention relates to improvements in sound records, also to improved materials and methods for production thereof.

Such records, that is to say, physical bodies carrying a trace or groove corresponding to a sound wave or the like, are ordinarily produced from composite material comprising a filler and a resinous or other cementitious binder therefor, the material being moulded while in a plastic state as a result of heating and being thereafter hardened by cooling either with or without a substantial degree of permanent induration.

In a co-pending application of F. E. Layman and L. T. Richardson filed Sept. 13, 1923, Serial No. 662,559 are disclosed and claimed certain improvements in sound records, comprising resins of the sulphur type, such resins having been found capable of production or treatment in ways tending to adapt the same to the sound reproducing art.

Such resins of the sulphur type may be produced from materials comprising on the one hand a hydrocarbonaceous or other organic body such as a phenol, naphthalene or the like, and on the other hand a substance such as a sulphur chloride, selenium chloride or the like capable of furnishing a quantity of sulphur or another element of the sulphur type, such as selenium, tellurium, etc.

The present invention, which is in the nature of an improvement over that disclosed in said copending application, has among its objects that of otherwise improving such resins of the sulphur type, in ways tending further and more completely to adapt the same to the sound reproducing art.

Another object is that of providing for improvement of other plastic binder materials for a like purpose.

Another object is that of providing superior sound records comprising such improved materials.

Another object is that of providing advantageous methods of treatment of the aforecharacterized materials for the purposes stated.

Other objects and advantages will hereinafter appear.

While the aforecharacterized resins of the sulphur type, or many of the same possess in ample degree most of the properties requisite in binder materials for sound records, nevertheless records produced from these resins are not in general characterized by the very highest degree of permanence or durability in service, and while fully equal in this and other respects to ordinary commercial records the same may still in certain instances and for particular purposes be slightly inferior to the very highest quality of commercial records in their ability to withstand the action of the reproducing stylus without appreciable deterioration from oft-repeated playing.

As a result of much investigation it has been found possible to so modify the properties of these and also of certain more or less analogous but inferior binder materials, as to render the same as regards desirable properties fully equivalent to the binders more generally employed, while retaining certain definite features of superiority thereover.

Thus it has been found possible by treatment including importation or incorporation of certain substances, which per se are not characterized by high resistivity toward abrasion or wear, to so change the properties of the aforecharacterized binder materials and others as to enhance very materially the wearing qualities of records including the same.

The substances which have been found advantageous for incorporation in such binder materials for the purpose indicated may vary considerably in physical and other properties and hence no limitation as to the precise theory in accordance with which the improvements are effected is to be imputed herein.

As typical of the materials and methods which may be utilized in securement of the herein contemplated improvements, a synthetic resin of the sulphur type, e. g., one produced from substantially 100 parts naphthalene, and 100 to 150 parts of sulphur monochloride in the presence of a trace of iron or other suitable catalytic or activating agent and either with or without additional sulphur or its equivalent up to about 200 parts, may be melted and thereto may be added a small quantity, as from 1 to 8 parts to each 100 parts of the resin of ozokerite or another substance having suitable characteristics, also preferably in melted condition. Stirring is preferably employed to promote intimate mixture.

The binder thus treated may be incorporated with a suitable filler, preferably one containing suitable proportions of flock and inorganic material and may be thereafter subjected to moulding treatment substantially in accordance with the usual practice for production of sound records from materials comprising the usual natural resin binders.

Records produced from materials treated as aforedescribed are characterized by very marked improvement in resistivity toward wear and deterioration in service, such improvement being sufficient to render the product, as regards such characteristic, the full equivalent of the best grades of records and in certain instances and respects even superior thereto.

Numerous substances heretofore employed in the plastic hot moulding art are similarly adapted to improvement by the foregoing treatment. Thus as a second example of a synthetic resin which is similarly capable of improvement may be mentioned the resin of the sulphur type corresponding to the one given in the foregoing example but having naphthalene replaced by a phenol.

Again it has been found that binders of the phenolic condensation type may be similarly and very materially improved in the respects noted. Also certain natural resins and gums, including copal may be very markedly improved in the aforementioned particulars by subjection to the treatment described.

Among the substances that have been found best adapted to this purpose are green ozokerite and carnauba wax, although similar advantages follow the use of like bodies of a waxy nature; and the expressions "wax" and "waxy material" as used in the appended claims are intended to cover the specific substances just mentioned, and their equivalents.

By processes and treatment of which the foregoing is exemplary it is thus possible to so far improve the properties of many of the binder materials heretofore regarded as inferior, as to adapt the same to the sound recording art and to production of sound records, which, as regards resistivity toward deterioration resulting from the action of the reproducing stylus, are the equivalent of the natural resin binder records heretofore employed.

What I claim as new and desire to secure by Letters Patent is:

1. The process of producing sound records which consists in mixing a sulphur-naphthalene resin, wax, and a filler, and moulding the mixture under pressure.

2. The process which comprises treating plastic materials comprising binders of the sulphur resin type, to adapt the material to production of sound records having augmented resistivity toward deterioration under action of the reproducing stylus, by incorporating in one hundred parts of the binder a quantity not exceeding eight parts of waxy substance.

3. The process of producing a binder for sound records which comprises incorporating, in a resin produced from materials including naphthalene and sulphur, a small quantity of a wax.

4. The process of producing a binder for sound records which comprises incorporating, in a resin produced from materials including naphthalene, sulphur and a chloride of sulphur, a relatively small quantity of green ozokerite.

5. The process of producing material adapted to the sound reproducing art which comprises incorporating in a resin produced from materials including naphthalene and sulphur, a relatively small quantity of a wax and a quantity of filler material.

6. The process of producing sound records, which comprises incorporating in a resin produced from materials including substantial proportions of naphthalene and a chloride of sulphur, a relatively small quantity of a wax and a quantity of filler material and moulding the compound under pressure while in a plastic state.

7. A binder for sound records, consisting of a sulphur-naphthalene resin treated to enhance the wearing quality of records comprising the same by incorporation in the resin of a relatively small quantity of green ozokerite.

8. Material for production of sound records comprising a filler and a binder therefor consisting of a sulphur-naphthalene resin treated to enhance the wearing quality of records comprising the same by incorporation in one hundred parts of the resin of a quantity not exceeding eight parts of green ozokerite.

9. A moulded sound record comprising a filler and a binder therefor including a resin of the sulphur type, having its resistance to wear enhanced by incorporation with one hundred parts of the resin of substantially less than ten parts of green ozokerite.

10. A moulded sound record comprising a filler and a binder therefor including a resin produced from materials including relatively large proportions of naphthalene and of a substance capable of furnishing a quantity of sulphur and having its resistance to wear enhanced by incorporation therein of a relatively small quantity of a waxy material.

11. A moulded sound record comprising a filler and a binder therefor including a resin produced from materials including relatively large proportions of naphthalene, sulphur, and a chloride of sulphur, and having its resistance to wear enhanced by incorporation in the resin of a relatively small quantity of green ozokerite.

12. A moulded sound record composed of a sulphur-naphthalene resin, wax, and a filler.

13. A moulded sound record composed of about 100 parts of a sulphur-naththalene resin, said resin having incorporated therewith about 1 to 8 parts of a waxy material, and a filler.

In witness whereof, I have hereunto subscribed my name.

OSCAR A. CHERRY.